United States Patent
Noda

(10) Patent No.: US 7,921,711 B2
(45) Date of Patent: Apr. 12, 2011

(54) ABNORMALITY DETERMINATION APPARATUS AND ABNORMALITY DETERMINATION METHOD FOR VALVE CHARACTERISTICS CHANGE MECHANISM

(75) Inventor: Minoru Noda, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 93 days.

(21) Appl. No.: 12/471,645

(22) Filed: May 26, 2009

(65) Prior Publication Data

US 2009/0288480 A1 Nov. 26, 2009

(30) Foreign Application Priority Data

May 23, 2008 (JP) ................................. 2008-135811

(51) Int. Cl.
*G01M 13/02* (2006.01)
(52) U.S. Cl. ................. 73/114.79; 123/90.15; 123/90.16
(58) Field of Classification Search ............... 73/114.79; 123/90.15, 90.16
See application file for complete search history.

(56) References Cited

U.S. PATENT DOCUMENTS

| | | | | |
|---|---|---|---|---|
| 6,405,697 B2* | 6/2002 | Mikame | ............... | 123/90.18 |
| 7,293,537 B2* | 11/2007 | Arai et al. | ............... | 123/90.16 |
| 7,308,873 B2* | 12/2007 | Arai et al. | ............... | 123/90.16 |
| 7,343,887 B2* | 3/2008 | Soejima | ............... | 123/90.15 |
| 7,424,872 B2* | 9/2008 | Fuwa et al. | ............... | 123/90.15 |
| 7,467,042 B2* | 12/2008 | Sikora et al. | ............... | 701/114 |
| 7,489,999 B2* | 2/2009 | Miyakoshi et al. | ............... | 701/103 |
| 7,721,691 B2* | 5/2010 | Tateno | ............... | 123/90.16 |
| 7,761,221 B2* | 7/2010 | Abe et al. | ............... | 701/105 |
| 7,765,041 B2* | 7/2010 | Tatsumi et al. | ............... | 701/29 |
| 2007/0101959 A1* | 5/2007 | Soejima | ............... | 123/90.17 |
| 2008/0289605 A1* | 11/2008 | Ito | ............... | 123/435 |
| 2010/0071644 A1* | 3/2010 | Noda et al. | ............... | 123/90.16 |
| 2010/0170459 A1* | 7/2010 | Fuwa et al. | ............... | 123/90.15 |
| 2010/0175662 A1* | 7/2010 | Fuwa et al. | ............... | 123/399 |

FOREIGN PATENT DOCUMENTS

| | | |
|---|---|---|
| JP | 2003041955 | 2/2003 |
| JP | 2005016339 | 1/2005 |
| JP | 2005016426 | 1/2005 |
| JP | 2005188286 A | 7/2005 |
| JP | 2007085328 | 4/2007 |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

To an electronic control unit is connected a shaft position detection sensor that outputs, as a shaft position detection value, a signal whose magnitude changes stepwise by a predetermined amount in correspondence with the position of a control shaft of a valve characteristics change mechanism. The electronic control unit stores in advance, as a determination reference value, the drive amount of an actuator at the time when the magnitude of the shaft position detection value changes. The electronic control unit performs normality determination to indicate that the valve characteristics change mechanism is operating normally when the drive amount at the time when the shaft position detection value changes along with driving of the actuator and the determination reference value correspond to each other, and performs abnormality determination to indicate that an abnormality is occurring in the valve characteristics change mechanism when the drive amount and the determination reference value do not correspond to each other.

10 Claims, 13 Drawing Sheets

FIG.5

| S1 | S2 | DISPLACEMENT COUNT VALUE |
|---|---|---|
| H | ↑ | +1 |
| H | ↓ | −1 |
| L | ↑ | −1 |
| L | ↓ | +1 |
| ↑ | H | −1 |
| ↓ | H | +1 |
| ↑ | L | +1 |
| ↓ | L | −1 |

↑ ⋯ RISING EDGE
↓ ⋯ FALLING EDGE

ABNORMALITY DETERMINATION APPARATUS AND ABNORMALITY DETERMINATION METHOD FOR VALVE CHARACTERISTICS CHANGE MECHANISM

INCORPORATION BY REFERENCE

The disclosure of Japanese Patent Application No. 2008-135811 filed on May 23, 2008 including the specification, drawings and abstract is incorporated herein by reference in its entirety.

BACKGROUND OF THE INVENTION

1. Field of the Invention

The present invention relates to an abnormality determination apparatus and an abnormality determination method for a valve characteristics change mechanism that determines whether or not the valve characteristics change mechanism that changes the maximum lift amount and the lift duration of an engine valve is operating normally.

2. Description of the Related Art

Japanese Patent Application Publication No. 2007-85328 (JP-A-2007-85328) discloses a valve characteristics change mechanism that changes the maximum lift amount and the lift duration of an engine valve of an internal combustion engine. In the internal combustion engine equipped with the valve characteristics change mechanism, the maximum lift amount and the lift duration of the engine valve are changed continuously in correspondence with axial displacement of a control shaft of the valve characteristics change mechanism.

The internal combustion engine including the valve characteristics change mechanism includes an actuator that converts rotational motion of a motor into linear motion of an output shaft to output the linear motion, and a rotation angle sensor that outputs a pulse signal along with rotation of the motor. Pulse signals output by the rotation angle sensor are counted to calculate a drive amount for the actuator, and the actuator is controlled such that the calculated drive amount approaches a target drive amount. Thus, the position of the control shaft of the valve characteristics change mechanism coupled to the output shaft of the actuator is controlled to change the maximum lift amount and the lift duration of the engine valve.

In order to improve the reliability of engine control by the valve characteristics change mechanism, it is necessary to ensure that the valve characteristics change mechanism is operating normally in correspondence with the drive amount of the actuator while driving the actuator. An example of a method of determining whether or not the valve characteristics change mechanism is operating normally may include providing the control shaft of the valve characteristics change mechanism with a sensor that detects the position of the control shaft and determining whether or not the position of the control shaft is changing in correspondence with changes in drive amount of the actuator. With this configuration, it is possible to determine that any abnormality is occurring in the valve characteristics change mechanism in the case where the shaft position detection sensor is not detecting displacement of the control shaft even though the actuator is being driven.

Specifically, a shaft position detection sensor is provided that outputs, as a shaft position detection value V, a signal whose magnitude changes stepwise by a predetermined amount $\Delta V$ in correspondence with displacement of the control shaft as shown in the upper part of FIG. 13. Output signals from the rotation angle sensor are counted to derive a rotation angle count value CR corresponding to the drive amount of the actuator. Then, it is determined whether or not the valve characteristics change mechanism is operating normally based on whether or not the shaft position detection value V changes by the predetermined amount $\Delta V$ or more while the rotation angle count value CR changes by a predetermined amount $\Delta CR$. The predetermined amount $\Delta CR$ is set to a value corresponding to the amount of change in rotation angle count value CR that occurs while the shaft position detection value V changes by at least $\Delta V$ in the state where the valve characteristics change mechanism is operating normally.

With this configuration, it is estimated that the control shaft is actually displaced along with driving of the actuator in the case where the shaft position detection value V changes by $\Delta V$ while the rotation angle count value CR changes by $\Delta CR$ as indicated by the solid line in FIG. 13. On the basis of this estimation, normality determination is performed to indicate that the valve characteristics change mechanism is operating normally. In contrast, in the case where the amount of change in shaft position detection value V that occurs while the rotation angle count value CR changes by the predetermined amount $\Delta CR$ is less than $\Delta V$, it is estimated that the control shaft is not displaced even though the actuator is driven. On the basis of this estimation, abnormality determination is performed to indicate that an abnormality is occurring in the valve characteristics change mechanism. That is, the reliability of the engine control through the valve characteristics change mechanism can be improved by determining whether or not the valve characteristics change mechanism is operating normally by monitoring changes in rotation angle count value CR corresponding to the drive amount of the actuator and shaft position detection value V output from the shaft position detection sensor as well.

In the case where abnormality determination is performed based on whether or not the shaft position detection value V changes by $\Delta V$ or more while the rotation angle count value CR changes by $\Delta CR$ as described above, however, while it is possible to determine whether or not the valve characteristics change mechanism is operating along with driving of the actuator, it may be difficult to determine whether or not the valve characteristics change mechanism is operating appropriately in correspondence with the drive amount of the motor.

For example, even if the amount of change in rotation angle count value CR relative to the amount of displacement of the control shaft is decreased as indicated by the single-dashed line in FIG. 13 because of wear of gears constituting the actuator, for example, normality determination may be performed when the shaft position detection value V changes by $\Delta V$ or more while the rotation angle count value CR changes by $\Delta CR$.

Meanwhile, even if the rotation angle count value CR is changed halfway through as indicated by the double-dashed line in FIG. 13 because of erroneous detection by the rotation angle sensor, for example, so that the amount of change of the rotation angle count value CR does not correspond to the amount of displacement of the control shaft, normality determination may be performed when the shaft position detection value V changes by $\Delta V$ or more while the rotation angle count value CR changes by $\Delta CR$.

The present invention has been made in view of the foregoing circumstances, and therefore aims to provide an abnormality determination apparatus and an abnormality determination method for a valve characteristics change mechanism that can determine not only whether or not the valve characteristics change mechanism is operating as an actuator is driven but also whether or not the valve characteristics change mechanism is operating appropriately in correspondence with the drive amount of the actuator, using a shaft position detection sensor whose output signal changes stepwise along with displacement of a control shaft.

SUMMARY OF THE INVENTION

According to an aspect of the present invention, there is provided an abnormality determination apparatus that determines whether or not a valve characteristics change mechanism is operating normally. The valve characteristics change mechanism is provided in an internal combustion engine, and changes a maximum lift amount and a lift duration of an engine valve continuously in correspondence with a position of a control shaft. The internal combustion engine includes the valve characteristics change mechanism, an actuator that drives the control shaft, and a drive amount detector that detects a drive amount of the actuator. The valve characteristics change mechanism is configured to change the maximum lift amount and the lift duration of the engine valve by controlling the actuator such that the drive amount approaches a target drive amount. The abnormality determination apparatus includes: a shaft position detection sensor that outputs, as a shaft position detection value, a signal whose magnitude changes stepwise by a predetermined amount in correspondence with the position of the control shaft; and an abnormality determiner that stores in advance, as a determination reference value, the drive amount at the time when a magnitude of the shaft position detection value changes. The abnormality determiner performs normality determination to indicate that the valve characteristics change mechanism is operating normally when the drive amount detected when the shaft position detection value changes along with driving of the actuator and the determination reference value correspond to each other, and performs abnormality determination to indicate that an abnormality is occurring in the valve characteristics change mechanism when the drive amount and the determination reference value do not correspond to each other.

When the control shaft of the valve characteristics change mechanism is displaced appropriately in correspondence with the drive amount of the actuator, the shaft position detection value changes invariably when the actuator is driven by the same drive amount. Here, according to the abnormality determination apparatus described above, the drive amount at the time when the shaft position detection value changes is stored in advance as the determination reference value to correlate changes in shaft position detection value with changes in drive amount of the actuator. Therefore, it is possible to adequately determine whether or not the control shaft is displaced appropriately in correspondence with the drive amount of the actuator by monitoring whether or not the drive amount at the time when the shaft position detection value changes and the stored determination reference value correspond to each other as described above. That is, according to the abnormality determination apparatus described above, it is possible to determine not only whether or not the valve characteristics change mechanism is operating along with driving of the actuator but also whether or not the valve characteristics change mechanism is operating appropriately in correspondence with the drive amount of the actuator, using the shaft position detection sensor whose output signal changes stepwise along with displacement of the control shaft.

According to another aspect of the present invention, there is provided an abnormality determination method that determines whether or not a valve characteristics change mechanism is operating normally. The valve characteristics change mechanism provided in an internal combustion engine, and changes a maximum lift amount and a lift duration of an engine valve continuously in correspondence with a position of a control shaft. The internal combustion engine includes the valve characteristics change mechanism, an actuator that drives the control shaft, and a drive amount detector that detects a drive amount of the actuator. The valve characteristics change mechanism is configured to change the maximum lift amount and the lift duration of the engine valve by controlling the actuator such that the drive amount approaches a target drive amount. The abnormality determination method includes the steps of:

outputting, as a shaft position detection value, a signal whose magnitude changes stepwise by a predetermined amount in correspondence with the position of the control shaft;

storing in advance, as a determination reference value, the drive amount at the time when a magnitude of the detected shaft position detection value changes;

performing normality determination to indicate that the valve characteristics change mechanism is operating normally when the drive amount detected when the shaft position detection value changes along with driving of the actuator and the determination reference value correspond to each other; and performing abnormality determination to indicate that an abnormality is occurring in the valve characteristics change mechanism when the drive amount and the determination reference value do not correspond to each other.

According to the abnormality determination method described above, the drive amount at the time when the shaft position detection value changes is stored in advance as the determination reference value to correlate changes in shaft position detection value with changes in drive amount of the actuator. Therefore, it is possible to adequately determine whether or not the control shaft is displaced appropriately in correspondence with the drive amount of the actuator by monitoring whether or not the drive amount at the time when the shaft position detection value changes and the stored determination reference value correspond to each other as described above. That is, according to the abnormality determination method described above, it is possible to determine not only whether or not the valve characteristics change mechanism is operating along with driving of the actuator but also whether or not the valve characteristics change mechanism is operating appropriately in correspondence with the drive amount of the actuator, using the shaft position detection sensor whose output signal changes stepwise along with displacement of the control shaft.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 5 is a table showing the relationship between the output signals from the rotation angle sensors and increase and decrease in displacement count value according to the first embodiment;

DETAILED DESCRIPTION OF EMBODIMENTS

Hereinafter, a description will be made of a first embodiment in which an abnormality determination apparatus for a valve characteristics change mechanism according to the present invention is embodied as an electronic control unit for an internal combustion engine equipped with the valve characteristics change mechanism with reference to FIGS. 1 to 8.

Figure 1:
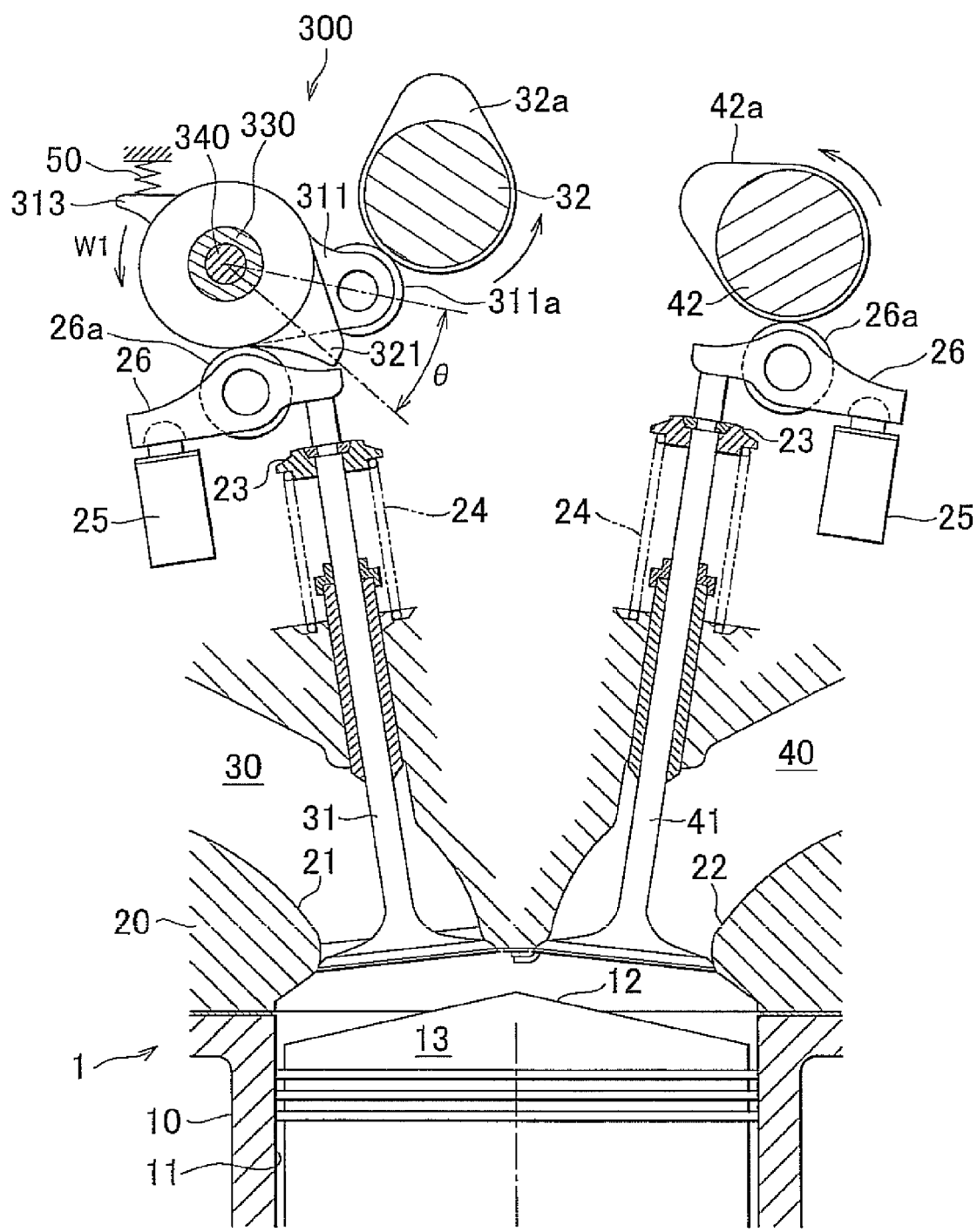
FIG. 1 is a cross sectional view showing the configuration of a valve drive mechanism for an internal combustion engine according to a first embodiment of the present invention.

FIG. 1 is a cross sectional view showing the configuration of a valve drive mechanism for the internal combustion engine according to this embodiment. As shown in FIG. 1, an engine main body 1 of the internal combustion engine includes a cylinder block 10 and a cylinder head 20 assembled to each other. A piston 12 is slidably accommodated in a cylinder 11 formed in the cylinder block 10. The cylinder head 20 is assembled to the top of the cylinder block 10. A combustion chamber 13 is defined by the inner peripheral surface of the cylinder 11, the upper surface of the piston 12, and the lower surface of the cylinder head 20.

The cylinder head 20 is formed with an intake port 21 and an exhaust port 22 both communicating with the combustion chamber 13. The intake port 21 is connected to an intake manifold (not shown) to constitute a part of an intake passage 30. The exhaust port 22 is connected to an exhaust manifold (not shown) to constitute a part of an exhaust passage 40.

As shown in FIG. 1, the cylinder head 20 is provided with an intake valve 31 that enables and disables the communication between the intake passage 30 and the combustion chamber 13, and an exhaust valve 41 that enables and disables the communication between the exhaust passage 40 and the combustion chamber 13. A retainer 23 is fixed to each valve 31, 41, and a valve spring 24 is provided between the cylinder head 20 and each retainer 23. Thus, each valve 31, 41 is urged in the direction of closing the valve by the urging force of the valve spring 24.

A lash adjuster 25 is provided inside the cylinder head 20 for each valve 31, 41. A rocker arm 26 is provided to extend between the lash adjuster 25 and each valve 31, 41. As shown in FIG. 1, one end of the rocker arm 26 is supported by the lash adjuster 25, and the other end abuts on the base end of each valve 31, 41.

In the cylinder head 20, an intake camshaft 32 and an exhaust camshaft 42 that actuate the valves 31, 41, respectively, are supported so as to be rotatable. The intake camshaft 32 is formed with an intake cam 32a, and the exhaust camshaft 42 is formed with an exhaust cam 42a. The outer peripheral surface of the exhaust cam 42a abuts on a roller 26a of the rocker arm 26 abutting on the exhaust valve 41. Thus, when the exhaust camshaft 42 rotates as indicated by the arrow in FIG. 1 during operation of the engine, the exhaust cam 42a causes the rocker arm 26 to swing about a portion supported by the lash adjuster 25 as a fulcrum. As a result, the exhaust valve 41 is lifted by the rocker arm 26 in the direction of opening the valve.

Meanwhile, a valve characteristics change mechanism 300 is provided between the intake cam 32a and the rocker arm 26 abutting on the intake valve 31. The valve characteristics change mechanism 300 has an input arm 311 and an output arm 321 supported so as to be swingable about a support pipe 330 fixed to the cylinder head 20. The rocker arm 26 is urged by the urging force of the valve spring 24 toward the output arm 321 with a roller 26a, which is provided at an intermediate portion of the rocker arm 26, abutting on the outer peripheral surface of the output arm 321.

A projection 313 is provided on the outer peripheral surface of the valve characteristics change mechanism 300. The projection 313 is urged by the urging force of a spring 50, which is fixed in the cylinder head 20, as indicated by the arrow W1 in FIG. 1. Hence, the valve characteristics change mechanism 300 is urged in the direction indicated by the arrow W1 about the support pipe 330 with a roller 311a, which is provided at the tip of the input arm 311, abutting on the outer peripheral surface of the intake cam 32a. Thus, when the intake cam 32a rotates as indicated by the arrow in FIG. 1 during operation of the engine, the intake cam 32a causes the valve characteristics change mechanism 300 to swing about the support pipe 330. Then, the output arm 321 causes the rocker arm 26 to swing about the portion supported by the lash adjuster 25 as a fulcrum. As a result, the intake valve 31 is lifted by the rocker arm 26 in the direction of opening the valve.

A control shaft 340 is inserted into the support pipe 330 so as to be axially movable. In the valve characteristics change mechanism 300, it is possible to change the relative phase difference between the input arm 311 and the output arm 321 about the support pipe 330, that is, the angle θ indicated in FIG. 1, by axially displacing the control shaft 340.

Figure 2:
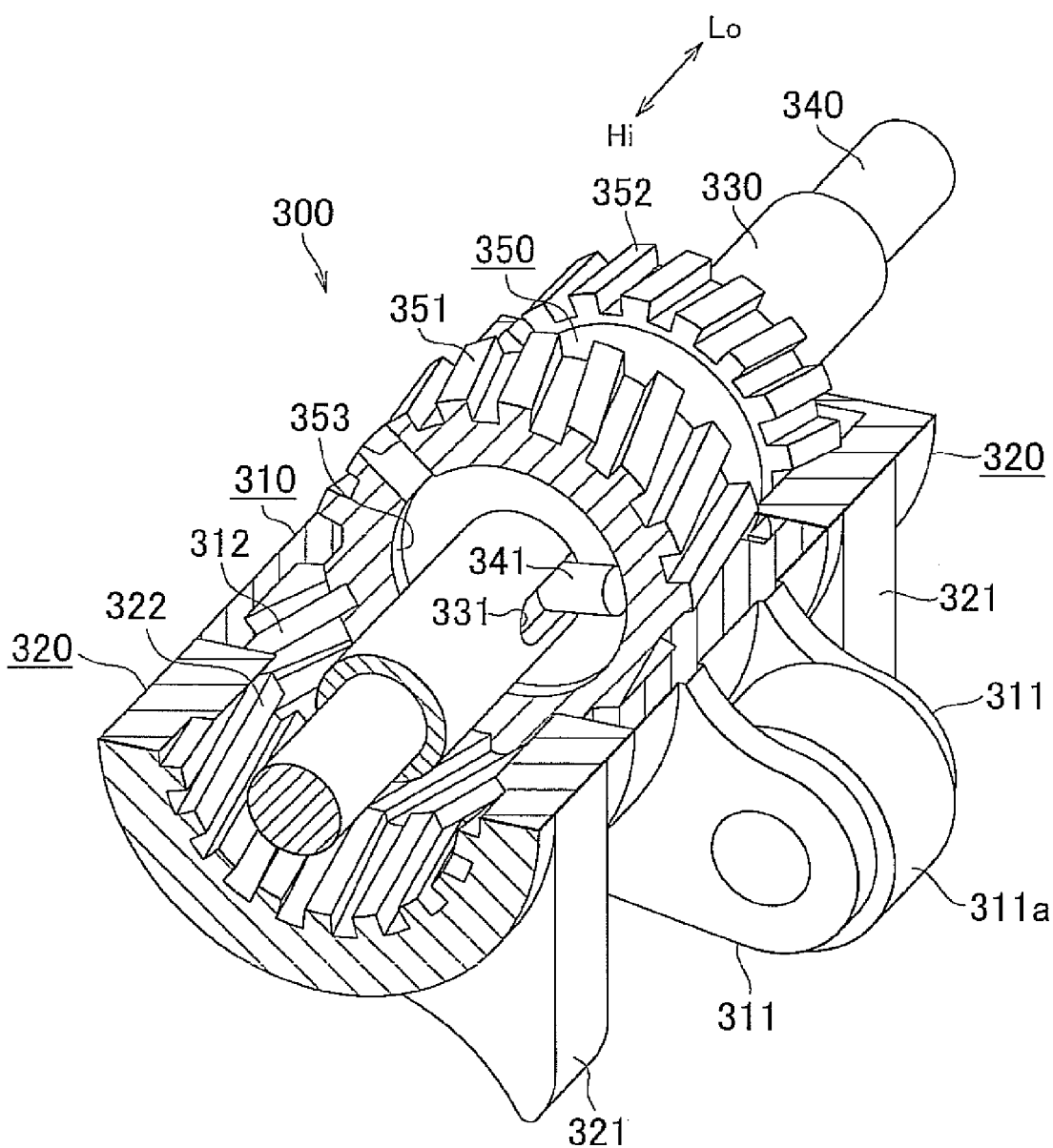
FIG. 2 is a perspective cutaway view of a valve characteristics change mechanism according to the first embodiment.

Now, the configuration of the valve characteristics change mechanism 300 is described in further detail with reference to FIG. 2. FIG. 2 is a perspective cutaway view showing the internal structure of the valve characteristics change mechanism 300. As shown in FIG. 2, the control shaft 340 is inserted into the support pipe 330, which is fixed to the cylinder head 20, so as to be axially movable. A cylindrical slider 350 is fitted on the support pipe 330 so as to be axially movable.

A groove 353 extending circumferentially is formed in the inner wall of the cylindrical slider 350. A retention pin 341 is fitted in the groove 353 with the base end of the retention pin 341 inserted in a recess (not shown) formed in the control shaft 340. An elongated hole 331 extending axially is formed in the pipe wall of the support pipe 330. The retention pin 341 is retained in the groove 353 of the slider 350 through the elongated hole 331. This allows the slider 350 to freely swing about the support pipe 330 and the control shaft 340, and to move in conjunction with axial displacement of the control shaft 340.

Helical splines 351 are formed on a center portion of the outer peripheral surface of the slider 350. Helical splines 352, whose teeth are inclined oppositely to the teeth of the helical splines 351, are formed on both end portions of the outer peripheral surface of the slider 350. As shown in FIG. 2, an input part 310 and a pair of output parts 320 disposed on both sides of the input part 310 are fitted on the slider 350. Helical splines 312 are formed on the inner peripheral surface of the input part 310, and meshed with the helical splines 351 of the slider 350. A pair of the input arms 311 are formed on the outer peripheral surface of the input part 310 to project in a radial direction of the control shaft 340. The roller 311a is supported between the pair of input arms 311 so as to be rotatable.

Meanwhile, helical splines 322 are formed on the inner peripheral surface of the pair of output parts 320, and respectively meshed with the helical splines 352 of the slider 350. The output arm 321 is formed on the outer peripheral surface of each output part 320 to project in a radial direction of the control shaft 340.

In the thus configured valve characteristics change mechanism 300, when the control shaft 340 is displaced axially, the slider 350 is displaced axially in conjunction. The helical splines 351, 352 formed on the outer peripheral surface of the slider 350 are inclined in different directions from each other, and meshed with the helical splines 312, 322 formed on the inner peripheral surface of the input part 310 and the outputs part 320, respectively. Therefore, when the slider 350 is displaced axially, the input part 310 and the output parts 320 rotate in opposite directions to each other. As a result, the relative phase difference between the input arm 311 and the output arms 321 is changed, and the maximum lift amount and the lift duration of the intake valve 31 are changed. Specifically, when the control shaft 340 is displaced in the direction of the arrow Hi indicated in FIG. 2, the slider 350 moves in the direction of the arrow Hi together with the control shaft 340. Accordingly, the relative phase difference between the input arm 311 and the output arms 321, that is, the angle θ in FIG. 1, is increased, and the maximum lift amount and the lift duration of the intake valve 31 are increased. On the other hand, when the control shaft 340 is displaced in the direction of the arrow Lo indicated in FIG. 2, the slider 350 moves in the direction of the arrow Lo together with the control shaft 340. Accordingly, the relative phase difference between the input arm 311 and the output arms 321 is reduced, and the maximum lift amount and the lift duration of the intake valve 31 are reduced.

In the internal combustion engine according to this embodiment, the valve characteristics change mechanism 300 changes the maximum lift amount and the lift duration of the intake valve 31 during operation of the engine to adjust an intake air amount GA.

Figure 3:
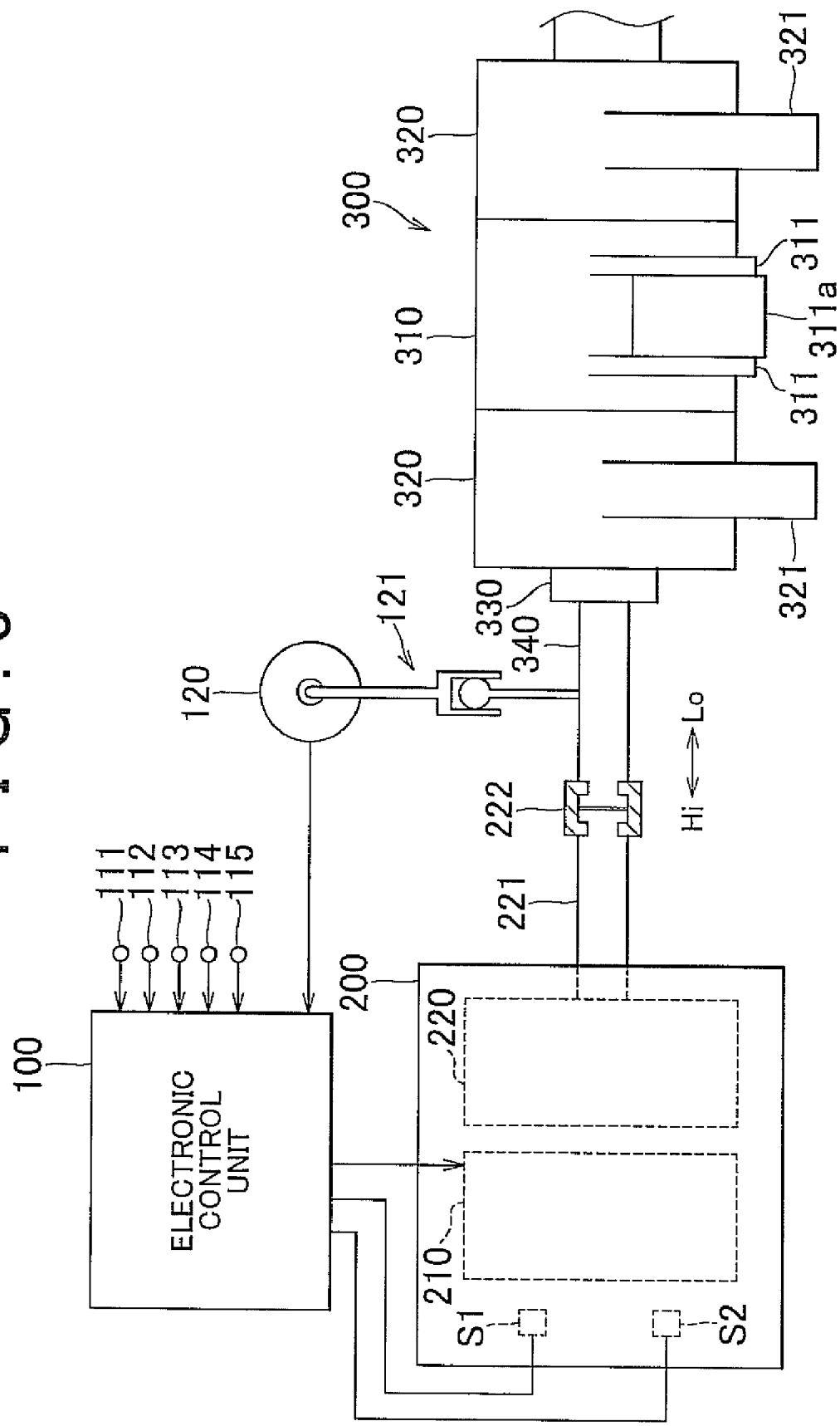
FIG. 3 is a schematic diagram showing the overall configuration of the valve characteristics change mechanism, an actuator that drives the valve characteristics change mechanism, and an electronic control unit that controls the actuator according to the first embodiment.
Figure 4:
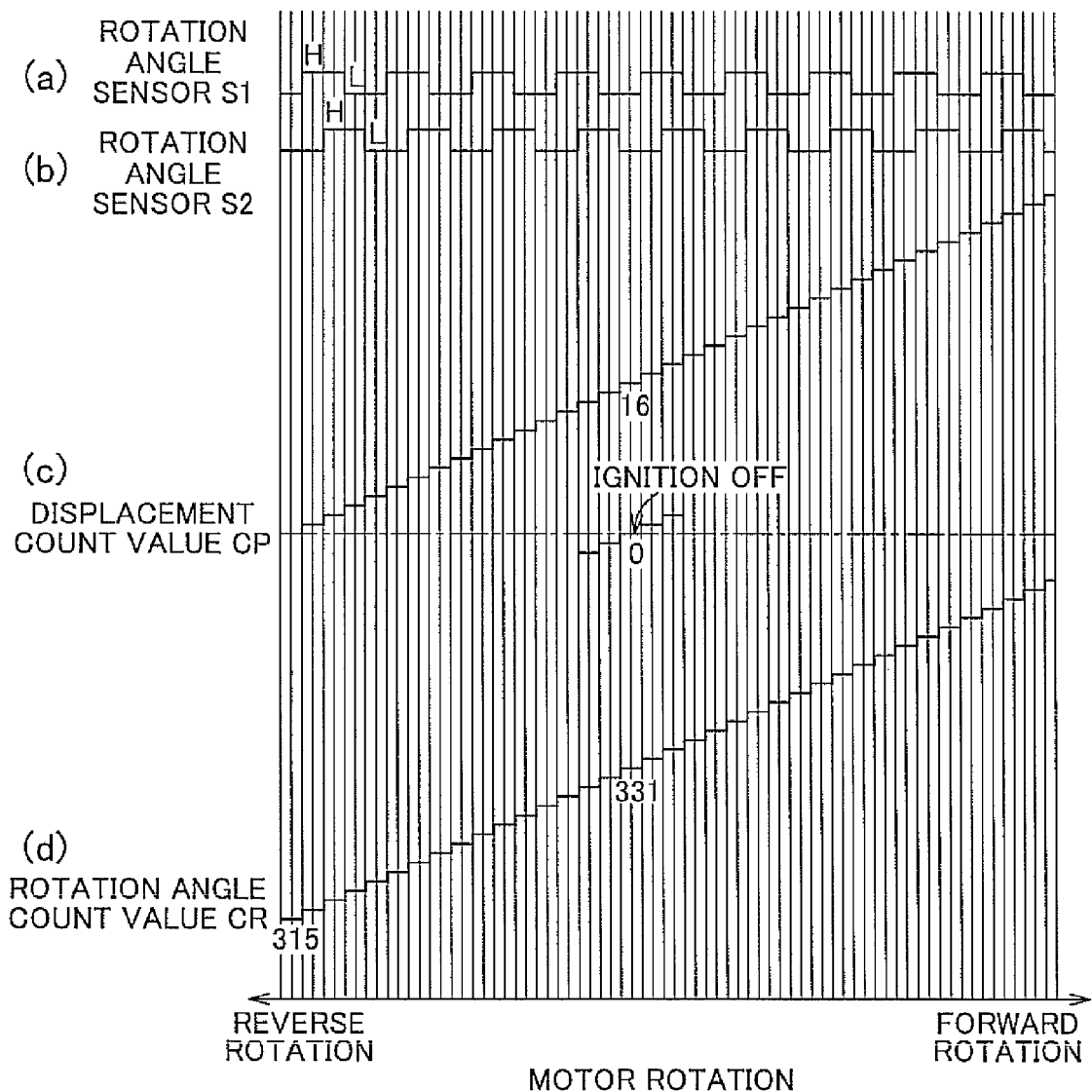
FIG. 4 is a timing chart showing the transition mode, along with rotation of a motor, of output signals from rotation angle sensors, a displacement count value, and a rotation angle count value, sequentially denoted as (a), (b), (c), and (d) from the top to the bottom of the drawing.

Now, a description is made of an actuator that axially displaces the control shaft 340 of the valve characteristics change mechanism 300 configured as described above, and of the control mode for the actuator, with reference to FIG. 3 to 5. FIG. 3 is a schematic diagram showing the overall configuration of the valve characteristics change mechanism 300, an actuator 200 that drives the valve characteristics change mechanism 300, and an electronic control unit 100 that controls the actuator 200.

As shown in FIG. 3, the actuator 200 includes a motor 210, and a motion conversion mechanism 220 that converts rotational motion of the motor 210 into axial linear motion of an output shaft 221. The tip of the control shaft 340 of the valve characteristics change mechanism 300 is coupled to the output shaft 221 of the actuator 200 by a coupler 222. Thus, by rotating the motor 210 within a predetermined range, for example within a rotation angle range corresponding to 10 revolutions (0 to 3600°), the rotational motion of the motor 210 is converted into linear motion through the output shaft 221 of the motion conversion mechanism 220 to be input to the control shaft 340, which is displaced axially to drive the valve characteristics change mechanism 300. When the motor 210 is rotated forward, the control shaft 340 moves in the direction of the arrow Hi in FIG. 3, increasing the relative phase difference between the input arm 311 and the output arms 321 of the valve characteristics change mechanism 300 as discussed above. On the other hand, when the motor 210 is rotated in reverse, the control shaft 340 moves in the direction of the arrow Lo in FIG. 3, reducing the relative phase difference between the input arm 311 and the output arms 321.

Movement of the control shaft 340 in the direction of the arrow Hi and in the direction of the arrow Lo is regulated within a predetermined range by a stopper (not shown) provided to the control shaft 340. The position of the control shaft 340 at which the stopper abuts on a part of the cylinder head 20 corresponds to the limit movable position of the control shaft 340.

By driving the actuator 200 to axially displace the control shaft 340 in this way, the maximum lift amount and the lift duration of the intake valve 31 are changed in correspondence with the axial position of the control shaft 340. The axial position of the control shaft 340 is changed in correspondence with the drive amount of the actuator 200, more specifically the rotation angle of the motor 210.

As shown in the left part of FIG. 3, the motor 210 is provided with two rotation angle sensors S1, S2 as drive amount detection devices that detect the drive amount of the actuator 200. The rotation angle sensors S1, S2 alternately output pulsed signals, namely high signals "H" and low signals "L", as indicated by the uppermost graph (a) and the second uppermost graph (b) in FIG. 4 in response to changes in magnetic flux of a multipolar magnet that has 48 poles and that rotates together with a rotor of the motor 210 when the motor 210 rotates. FIG. 4 is a timing chart showing the transition mode, along with rotation of the motor 210, of the signals from the rotation angle sensors S1, S2, a displacement count value CP, and a rotation angle count value CR.

The rotation angle sensors S1, S2 output the pulse signals in different phases from each other. Edges of the each pulse signal output from the rotation angle sensors S1, S2 are produced each 7.5° of rotation of the motor 210. The pulse signals from one sensor are different in phase from the pulse signals from the other by 3.75° of rotation of the motor 210. Thus, the edges of the pulse signals from the rotation angle sensor S1 are spaced from the edges of the pulse signals from the rotation angle sensor S2 by 3.75°.

As shown in FIG. 3, the pulse signals output from the rotation angle sensors S1, S2 are taken by the electronic control unit 100 which comprehensively controls the internal combustion engine. Then, the electronic control unit 100 controls the motor 210 based on these signals. The electronic control unit 100 includes a central processing unit and various memories such as a read only memory (ROM), a random access memory (RAM), and an EEPROM which is a rewritable non-volatile memory.

To the electronic control unit 100 are connected an accelerator sensor 111 that detects the operation amount of an acceleration pedal depressed by a driver (accelerator pedal operation amount ACCP), an air flow meter 112 that detects the amount of air to be drawn into the combustion chamber 13 through the intake passage 30, namely the intake air amount GA, a crank angle sensor 113 that detects an engine speed NE, a cam position sensor 114 that detects the rotation phase of the intake camshaft 32, a coolant temperature sensor 115 that detects an engine coolant temperature THW, and so forth. The electronic control unit 100 receives signals from the various sensors 111 to 115 in addition to the pulse signals from the rotation angle sensors S1, S2.

A shaft position detection sensor 120 that detects the axial position of the control shaft 340 is connected to the electronic control unit 100 according to this embodiment. As shown in the center part of FIG. 3, the shaft position detection sensor 120 is coupled to the control shaft 340 of the valve characteristics change mechanism 300 via a link member 121. This allows axial linear motion of the control shaft 340 to be converted into rotational motion to be input to the shaft position detection sensor 120 via the link member 121. The shaft position detection sensor 120 includes a rotary encoder having an input shaft that is rotated by the input rotational motion to output a signal whose magnitude changes stepwise in correspondence with changes in rotation angle of the input shaft. The shaft position detection sensor 120 outputs a shaft position detection value V that changes by the predetermined amount ΔV in correspondence with the axial position of the control shaft 340. In the internal combustion engine according to this embodiment, the shaft position detection value V increases as the control shaft 340 is driven toward the Hi side, which increases the maximum lift amount and the lift duration of the intake valve 31.

The electronic control unit 100 executes various processes associated with driving of the valve characteristics change mechanism 300, that is, driving of the motor 210, in addition to processes associated with the fuel injection amount and ignition timing control. Specifically, the electronic control unit 100 detects the drive amount of the actuator 200 based on the signals from the rotation angle sensors S1, S2. The electronic control unit 100 then calculates a target drive amount that matches the engine operation state based on the signals detected by the various sensors, and controls the drive amount of the motor 210 such that the drive amount detected coincides with the target drive amount. In order to precisely control the maximum lift amount and the lift duration of the intake valve 31 by controlling the actuator 200 in this way, it is necessary to accurately detect the drive amount of the actuator 200 corresponding to the position of the control shaft 340.

Now, a detailed description is made of a detection method for the drive amount of the actuator 200 with reference to FIGS. 4 and 5. As discussed above, the graphs (a), (b) in FIG. 4 indicate the patterns of the pulse signals output from the rotation angle sensors S1, S2, respectively, when the motor 210 rotates. The second lowermost graph (c) and the lowermost graph (d) in FIG. 4 indicate the transition mode of the displacement count value CP and the rotation angle count value CR along with rotation of the motor 210. FIG. 5 is a table showing the relationship between the output signals from the rotation angle sensors S1, S2 and increase and decrease in displacement count value CP.

The displacement count value CP corresponds to an integrated rotation angle which represents how much the motor 210 has rotated after an ignition switch is turned on (ignition on) to start the internal combustion engine. The rotation angle count value CR is calculated based on a reference value CRst that indicates a reference rotation angle and the displacement count value CP, and represents the rotation angle of the motor 210 from the reference rotation angle, that is, the drive amount of the actuator 200 from a reference position. The reference value CRst is the rotation angle count value CR at the termination of the preceding engine operation, and stored in the EEPROM each time engine operation terminates.

To detect the position of the control shaft 340, first, the displacement count value CP is increased on decreased at each edge of the pulse signals output from the rotation angle sensors S1, S2 based on the output patterns of the pulse signals. Specifically, as shown in FIG. 5, a value "+1" or "−1" is added to the displacement count value CP depending on whether a pulse signal from one of the rotation angle sensors S1, S2 is at a rising edge or a falling edge and whether the other sensor is outputting a high signal "H" or a low signal "L". In FIG. 5, the symbol "↑" represents a rising edge of a pulse signal, and the symbol "↓" represents a falling edge of a pulse signal. The thus obtained displacement count value CP is a value obtained based on the number of edges of the pulse signals from the rotation angle sensors S1, S2.

While the motor 210 is rotating forward, the displacement count value CP is increased by "1" at each edge of the pulse signals from the rotation angle sensors S1, S2 as shown in FIG. 4(c). Meanwhile, while the motor 210 is rotating in reverse, the displacement count value CP is decreased by "1" at each edge. The displacement count value CP is stored in the RAM of the electronic control unit 100, and therefore reset to "0" when the ignition switch is turned off (ignition off) as shown in FIG. 4(c) and the RAM stops being energized.

When the displacement count value CP is calculated in this way, the electronic control unit 100 calculates a rotation angle count value CR based on the reference value CRst stored in the EEPROM and the calculated displacement count value CP. Specifically, a value obtained by adding the displacement count value CP to the reference value CRst stored in advance in the EEPROM is calculated as a new rotation angle count value CR. The drive amount of the actuator 200 is detected while the rotation angle count value CR is updated in this way.

Thus, while the motor 210 is rotating forward, the rotation angle count value CR increases in accordance with the amount of increase in displacement count value CP as shown in FIG. 4(d). On the other hand, while the motor 210 is rotating in reverse, the rotation angle count value CR decreases in accordance with the amount of decrease in displacement count value CP.

When the rotation angle count value CR is calculated, the electronic control unit 100 compares the rotation angle count value CR with a target rotation angle count value CRp as the target drive amount for the actuator 200. Then, the electric control unit 100 controls the drive amount of the motor 210 such that the calculated rotation angle count value CR coincides with the target rotation angle count value CRp to control the valve characteristics change mechanism 300.

The electronic control unit 100 according to this embodiment executes an abnormality determination process to determine whether or not the valve characteristics change mechanism 300 is operating normally as the motor 21 is driven, in addition to the drive control of the valve characteristics change mechanism 300.

Figure 6:
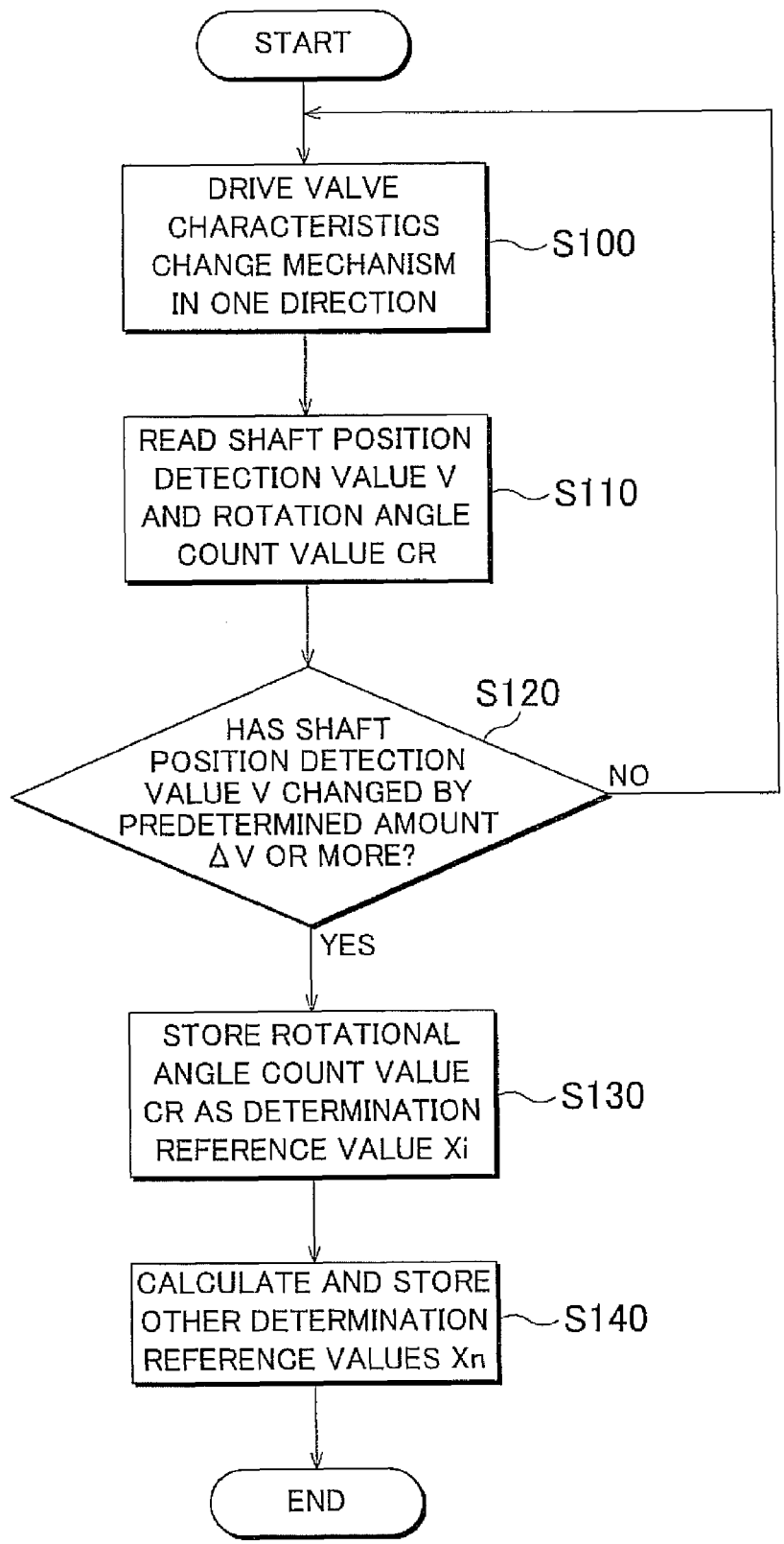
FIG. 6 is a flowchart showing a sequence of processes in a determination reference value learning process according to the first embodiment.
Figure 7:
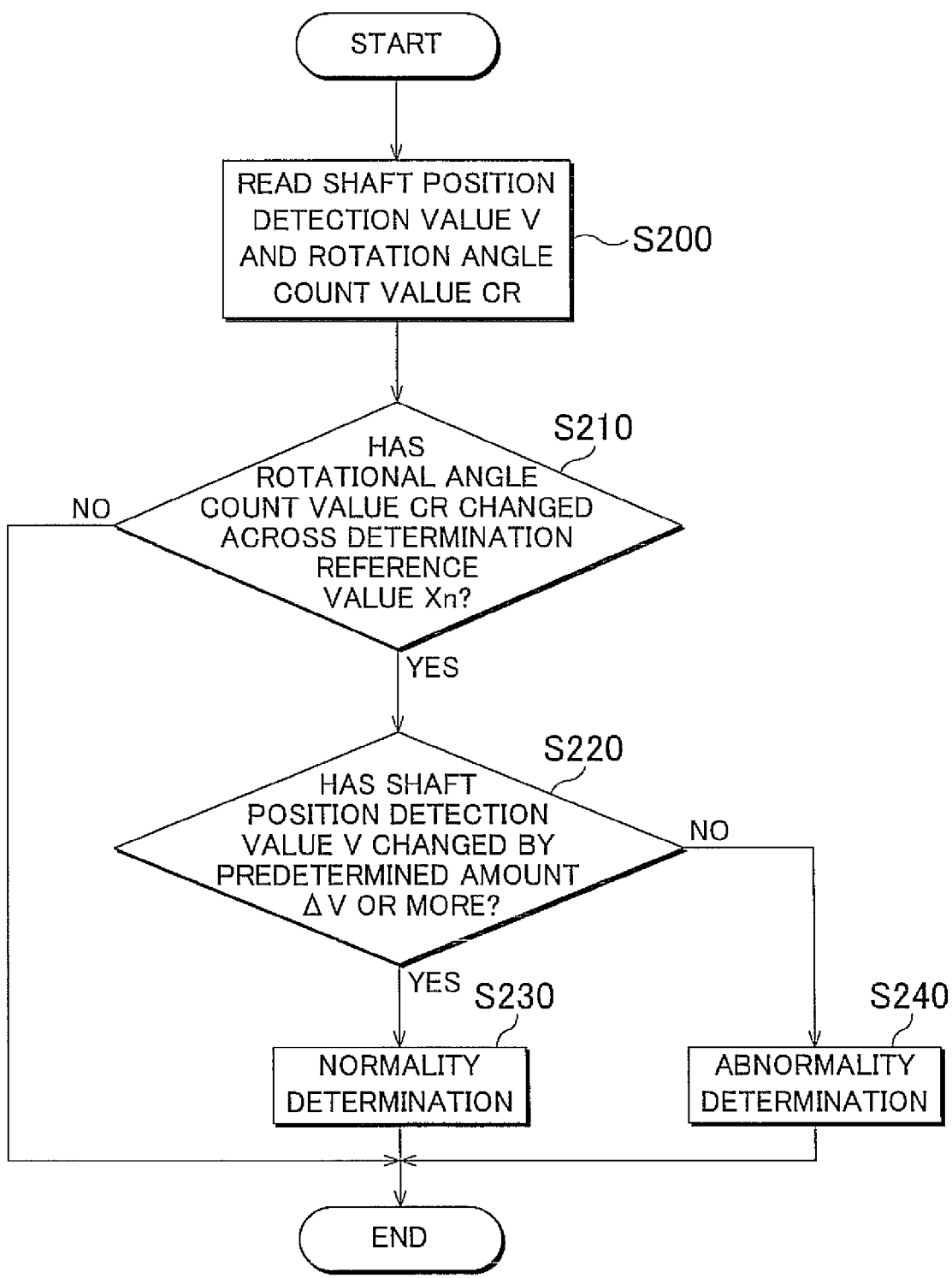
FIG. 7 is a flowchart showing a sequence of processes in an abnormality determination process according to the first embodiment.

A detailed description is made of the abnormality determination process below with reference to FIGS. 6 to 8. FIG. 6 is a flowchart showing a sequence of processes in a determination reference value learning process to learn determination reference values Xn which are necessary for the abnormality determination process. This process is executed immediately after the valve characteristics change mechanism 300 and the actuator 200 are assembled to the internal combustion engine.

When this process is executed, as shown in FIG. 6, the electronic control unit 100 rotates the motor 210 of the actuator 200 in one direction to drive the valve characteristics change mechanism 300 in one direction in step S100.

Then, in step S110, the shaft position detection value V and the rotation angle count value CR are read. When the shaft position detection value V and the rotation angle count value CR are read, the process proceeds to step S120, where it is determined whether or not the shaft position detection value V has changed by the predetermined amount $\Delta V$ or more.

If it is determined in step S120 that the shaft position detection value V has not changed by $\Delta V$ or more (step S120: NO), the process returns to step S100 to repeat steps S100 to S120. That is, the shaft position detection value V and the rotation angle count value CR are repeatedly detected while driving the valve characteristics change mechanism 300 in one direction until the shaft position detection value V changes by $\Delta V$ or more.

If it is determined in step S120 that the shaft position detection value V has changed by $\Delta V$ or more (step S120: YES), the process proceeds to step S130, where the current rotation angle count value CR is stored as a determination reference value Xi in the memory. That is, the rotation angle count value CR corresponding to a threshold at which the shaft position detection value V changes stepwise is stored as the determination reference value Xi in the memory. The suffix "i" to the determination reference value Xi corresponds to one of a plurality of rotation angle count values CR respectively corresponding to thresholds at which the shaft position detection value V changes, and indicates that the determination reference value Xi is an "i"-th determination reference value from the smallest (where i is a positive integer).

When the determination reference value Xi is stored in step S130, other determination reference values Xn are calculated based on the output characteristics of the shaft position detection sensor 120 and the determination reference value Xi and stored in the memory in step S140. When all the determination reference values X1, X2, . . . , Xn are set and stored in the memory, the electronic control unit 100 terminates this process.

When the determination reference value learning process is terminated, a reference position learning process is executed, where the control shaft 340 of the valve characteristics change mechanism 300 is driven to the limit movable position to correct the rotation angle count value CR.

Specifically, the rotation angle count value CR at the time when the control shaft 340 is driven to and stopped at the limit movable position is detected as the rotation angle count value at the reference position, and the rotation angle count value CR is corrected based on the detected rotation angle count value. For example, in the case where the rotation angle count value CR detected at the limit movable position is "20" where it should be "0", a correction value of "−20" is set. Then, the correction value is added to the rotation angle count value CR to offset the deviation in rotation angle count value CR.

The correction value of "−20" is also added to each determination reference value Xn set in the determination reference value learning process discussed above so that each determination reference value Xn corresponds to the rotation angle count value CR after the correction.

With the rotation angle count values CR corresponding to the thresholds at which the shaft position detection value V changes being stored as the determination reference value Xn in the electronic control unit 100, it is possible to correlate the shaft position detection value V, which changes along with displacement of the control shaft 340, with the rotation angle count value CR, which changes in correspondence with the drive amount of the actuator 200.

In the internal combustion engine according to this embodiment, it is determined whether or not the control shaft 340 is displaced appropriately in correspondence with the drive amount of the actuator 200 by monitoring whether or not the rotation angle count value CR at the time when the shaft position detection value V changes while the valve characteristics change mechanism 300 is driven and the stored determination reference values Xn correspond to each other.

A detailed description is made of the abnormality determination process for the valve characteristics change mechanism 300 below with reference to FIGS. 7 and 8. FIG. 7 is a flowchart showing a sequence of processes in the abnormality determination process according to this embodiment. This process is executed by the electronic control unit 100 repeatedly in a predetermined control cycle while the valve characteristics change mechanism 300 is driven.

When this process is executed, first in step S200, the electronic control unit 100 reads the shaft position detection value V and the rotation angle count value CR. Then, in step S210, it is determined whether or not the rotation angle count value CR has changed across the determination reference value Xn. That is, it is determined whether or not the rotation angle count value CR has changed from a value less than the determination reference value Xn to a value more than the determination reference value Xn, or whether or not the rotation angle count value CR has changed from a value more than the determination reference value Xn to a value less than the determination reference value Xn.

If it is determined in step S210 that the rotation angle count value CR has not changed across the determination reference value Xn (step S210: NO), this process is temporarily terminated.

On the other hand, if it is determined in step S210 that the rotation angle count value CR has changed across the determination reference value Xn (step S210: YES), the process proceeds to step S220, where it is determined whether or not the shaft position detection value V has changed by the predetermined amount $\Delta V$ or more. That is, a comparison is made between the shaft position detection value V immediately before the rotation angle count value CR changes across the determination reference value Xn and the shaft position detection value V immediately after the rotation angle count value CR changes across the determination reference value Xn to determine whether or not the difference between these values is $\Delta V$ or more.

If it is determined in step S220 that the shaft position detection value V has changed by $\Delta V$ or more when the rotation angle count value CR changes across the determination reference value Xn (step S220: YES), the process proceeds to step S230, where normality determination is performed to indicate that the valve characteristics change mechanism 300 is operating normally along with driving of the actuator 200. After performing normality determination, the electronic control unit 100 temporarily terminates this process.

On the other hand, if it is determined in step S220 that the shaft position detection value V has not changed by $\Delta V$ or more when the rotation angle count value CR changes across the determination reference value Xn (step S220: NO), the process proceeds to step S240, where abnormality determination is performed to indicate that an abnormality is occurring in the valve characteristics change mechanism 300. In the case where abnormality determination is performed, the electronic control unit 100 executes abnormality control such as turning on a warning lamp to inform the driver of the occurrence of an abnormality and prohibiting driving of the valve characteristics change mechanism 300.

Figure 8:
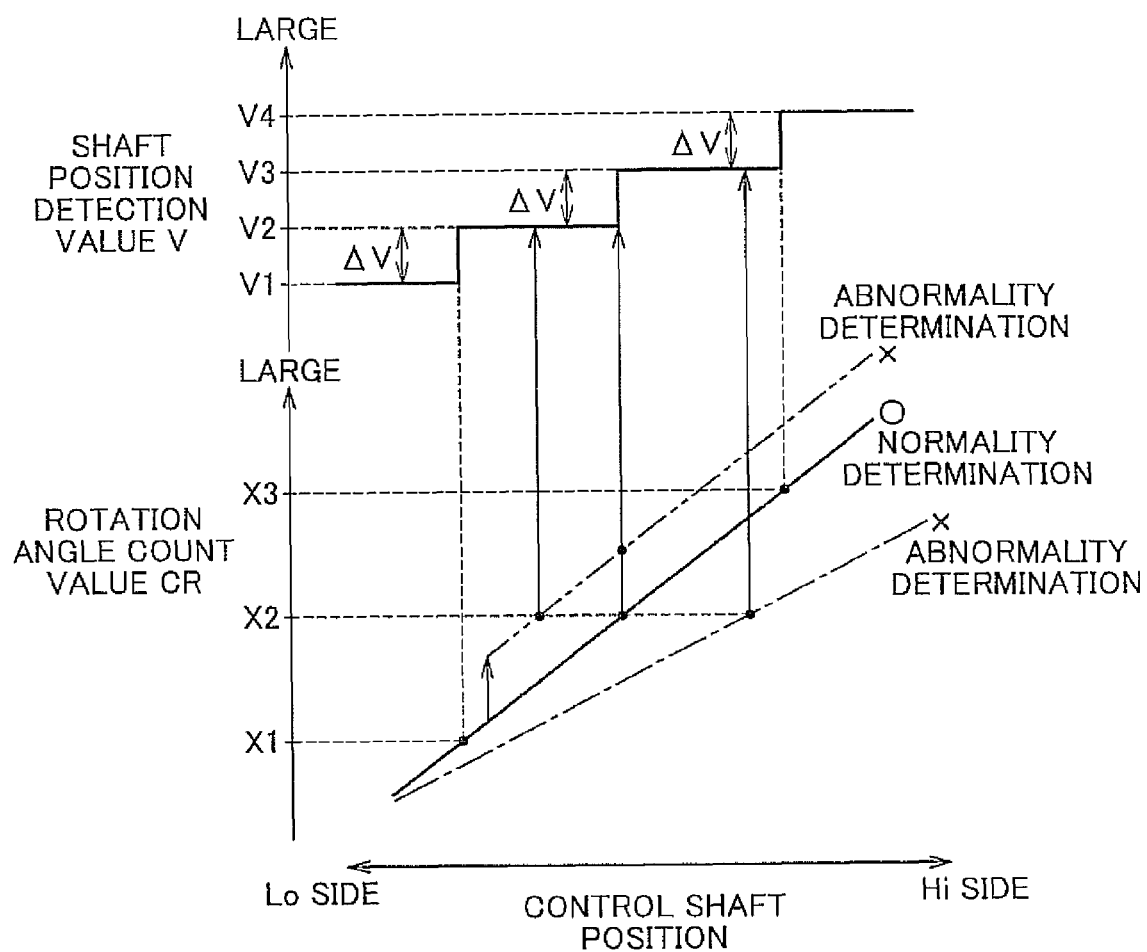
FIG. 8 illustrates the determination mode in the abnormality determination process according to the first embodiment.

A description is made of the function of the abnormality determination process according to this embodiment with reference to FIG. 8. As shown in FIG. 8, the shaft position detection value V changes stepwise by the predetermined amount ΔV along with displacement of the control shaft 340 of the valve characteristics change mechanism 300. As discussed above, the rotation angle count values CR corresponding to the thresholds at the time when the shaft position detection value V changes are stored in advance in the electronic control unit 100 according to this embodiment as the determination reference values X1, X2, X3, through the determination reference value learning process executed after the assembly of the valve characteristics change mechanism 300.

Then, in the abnormality determination process according to this embodiment, it is monitored whether or not the shaft position detection value V changes by ΔV or more when the rotation angle count value CR changes across the determination reference values X1, X2, and X3 along with driving of the actuator 200.

Therefore, in the case where the valve characteristics change mechanism 300 is operating normally along with driving of the actuator 200 as indicated by the solid line in FIG. 8, the shaft position detection value V changes by ΔV, for example from V2 to V3 or from V3 to V2 when the rotation angle count value CR changes across the determination reference value X2. On the basis of the above, normality determination is performed.

Meanwhile, in the case where the amount of change in rotation angle count value CR is decreased relative to the amount of displacement of the control shaft 340 as indicated by the single-dashed line in FIG. 8 because of wear of gears constituting the motion conversion mechanism 220 of the actuator 200, for example, the shaft position detection value V does not change but remains at V3 when the rotation angle count value CR changes across the determination reference value X2. On the basis of the above, abnormality determination is performed.

Moreover, in the case where the rotation angle count value CR is changed halfway through as indicated by the double-dashed line in FIG. 8 because of erroneous detection by the rotation angle sensors S1, S2, for example, so that the amount of change in rotation angle count value CR does not correspond to the amount of displacement of the control shaft 340, the shaft position detection value V does not change but remains at V2 when the rotation angle count value CR changes across the determination reference value X2. On the basis of the above, abnormality determination is performed.

According to the first embodiment described above, the following effects are obtained. (1) When the control shaft 340 of the valve characteristics change mechanism 300 is displaced appropriately in correspondence with the drive amount of the actuator 200, the shaft position detection value V changes invariably when the actuator 200 is driven by the same drive amount. In this embodiment, the rotation angle count values CR at the time when the shaft position detection value V changes are stored in advance as the determination reference values Xn in the electronic control unit 100 to correlate changes in shaft position detection value V with changes in rotation angle count value CR. Therefore, it is possible to adequately determine whether or not the control shaft 340 is displaced appropriately in correspondence with the drive amount of the actuator 200 by monitoring whether or not the rotation angle count value CR at the time when the shaft position detection value V changes and the stored determination reference value Xn correspond to each other as described above. That is, according to the above embodiment, it is possible to determine not only whether or not the valve characteristics change mechanism 300 is operating along with driving of the actuator 200 but also whether or not the valve characteristics change mechanism 300 is operating appropriately in correspondence with the drive amount of the actuator 200, using the shaft position detection sensor 120 whose output signal changes stepwise along with displacement of the control shaft 340.

(2) In the case where the difference between the shaft position detection value V immediately before and after the rotation angle count value CR detected by the rotation angle sensors S1, S2 changes across the determination reference value Xn is ΔV or more, that is, in the case where the shaft position detection value V changes when the rotation angle count value CR changes across the determination reference value Xn, it is estimated that the rotation angle count value CR at the time when the shaft position detection value V changes and the determination reference value Xn correspond to each other. On the basis of the above, normality determination can be performed to indicate that the valve characteristics change mechanism 300 is operating normally. On the other hand, in the case where the shaft position detection value V does not change when the detected rotation angle count value CR changes across the determination reference value Xn, it is estimated that the rotation angle count value CR at the time when the shaft position detection value V changes and the determination reference value Xn do not correspond to each other. On the basis of the above, abnormality determination can be performed to indicate that an abnormality is occurring in the valve characteristics change mechanism 300.

That is, by monitoring whether or not the shaft position detection value V changes when the rotation angle count value CR detected by the rotation angle sensors S1, S2 changes across the determination reference value Xn as in the first embodiment, it is possible to determine based on the monitoring results whether or not the valve characteristics change mechanism 300 is operating normally.

(3) The rotation angle count value CR at the time when the shaft position detection value V changes may vary between individual devices because of, for example, the mounting tolerance of the shaft position detection sensor 120, that is, variations in mounting position of the shaft position detection sensor 120. In the presence of such variations, there may be variations, between individual devices, in determination results based on the correlation between the rotation angle count value CR at the time when the shaft position detection value V changes and the determination reference value Xn, degrading the reliability of the determination results. In contrast, in this embodiment, the determination reference value learning process is executed in which the control shaft 340 is displaced in one direction to actually detect the rotation angle count value CR at the time when the shaft position detection value V changes and store the actually detected rotation angle count value CR as the determination reference value Xi. Therefore, the determination reference value Xi can be set appropriately for individual devices. Thus, even if there are variations in rotation angle count value CR at the time when the shaft position detection value V changes because of the mounting tolerance of the shaft position detection sensor 120, for example, it is possible to suppress degradation in reliability of the determination results due to such variations.

(4) In the case where the output characteristics of the shaft position detection sensor 120 are known beforehand, it is possible to acquire at least one determination reference value Xi based on the actually detected rotation angle count value CR and calculate other determination reference values Xn based on the determination reference value Xi as in the above first embodiment. According to this configuration, the determination reference values Xn can be set appropriately and easily compared to the case where all the determination reference values Xn are set based on actually detected values.

(5) The rotation angle count value CR can be learned accurately on the basis of the limit movable position of the control shaft 340 by executing the determination reference value learning process and then the reference position learning process. Because the determination reference values Xn are corrected so as to correspond to the thus corrected accurate rotation angle count value CR, it is possible to more accurately determine whether or not the valve characteristics change mechanism 300 is operating normally.

The above first embodiment may be modified suitably and implemented as follows. In the above first embodiment, whether or not the shaft position detection value V changes when the rotation angle count value CR changes across the determination reference value Xn is monitored, and abnormality determination is performed depending on the monitoring results. However, it is also possible to additionally monitor whether or not the shaft position detection value V changes when the rotation angle count value CR does not change across the determination reference value Xn, and perform abnormality determination depending on the monitoring results.

Figure 9:
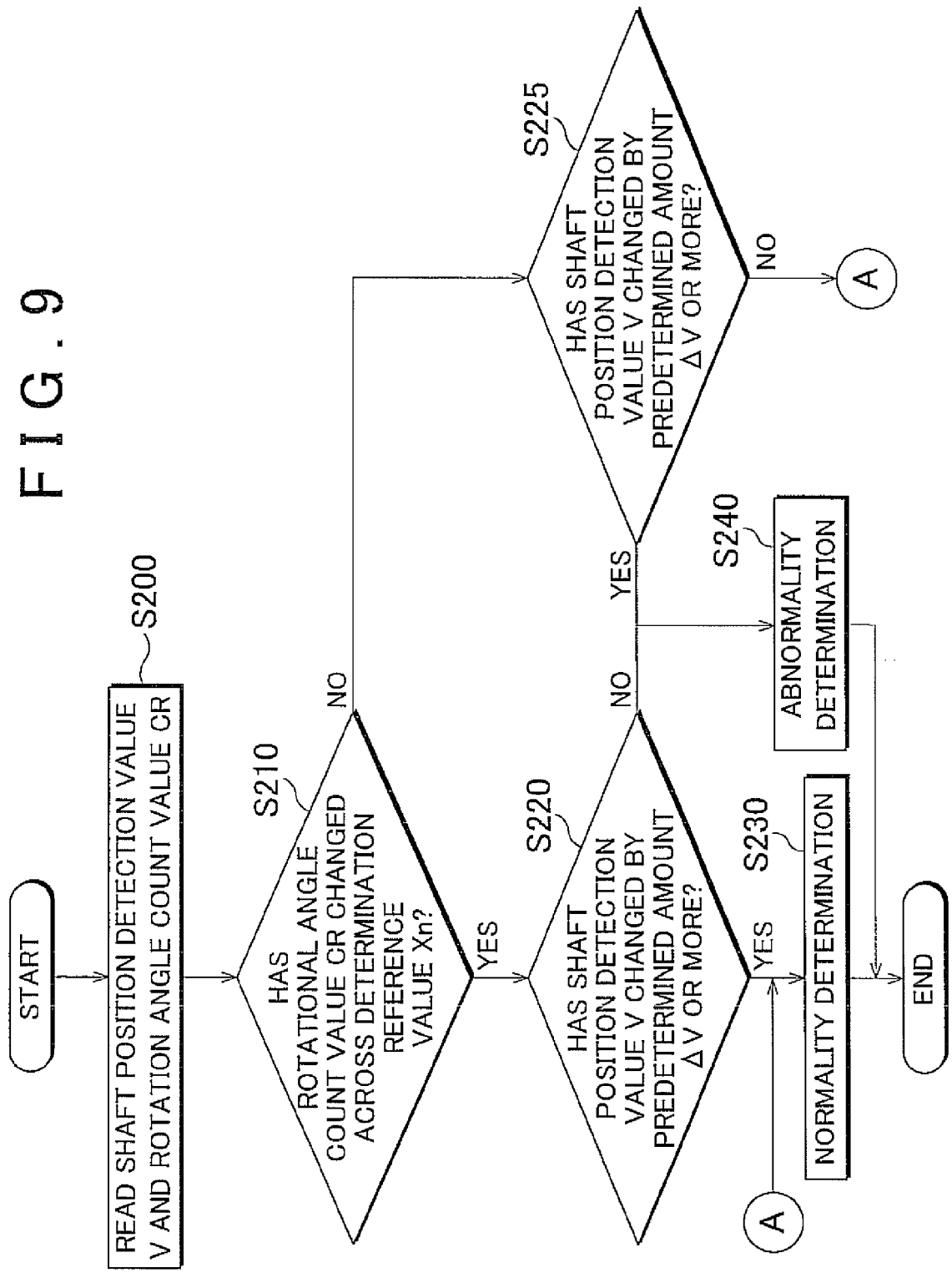
FIG. 9 is a flowchart showing a sequence of processes in an abnormality determination process according to a modified example of the first embodiment.

Specifically, a part of the abnormality determination process in the above first embodiment may be modified to perform an abnormality determination process shown in FIG. 9. In this abnormality determination process, if it is determined in step S210 that the rotation angle count value CR has changed across the determination reference value Xn (step S210: YES), the process proceeds to step S220 as in the above first embodiment, and abnormality determination is performed depending on whether or not the shaft position detection value V has changed by the predetermined amount $\Delta V$ or more. On the other hand, if it is determined in step S210 that the rotation angle count value CR has not changed across the determination reference value Xn (step S210: NO), the process proceeds to step S225, where it is determined whether or not the shaft position detection value V has changed by the predetermined amount $\Delta V$ or more.

Then, if it is determined in step S225 that the shaft position detection value V has not changed by $\Delta V$ or more (step S225: NO), the process proceeds to step S230, where normality determination is performed. On the other hand, if it is determined in step S225 that the shaft position detection value V has changed by $\Delta V$ or more (step S225: YES), that is, if it is determined that the shaft position detection value V has changed even though the rotation angle count value CR has not changed across the determination reference value Xn, the process proceeds to step S240, where abnormality determination is performed.

In the case where the shaft position detection value V has changed even though the rotation angle count value CR has not changed across the determination reference value Xn as described above, it is possible to determine that displacement of the control shaft 340 does not correspond to the drive amount of the actuator 200, and to perform abnormality determination based on the above determination.

It is also possible to monitor only whether or not the shaft position detection value V changes by $\Delta V$ or more when the rotation angle count value CR does not change across the determination reference value Xn, and to perform abnormality determination depending on the monitoring results.

Figure 10:
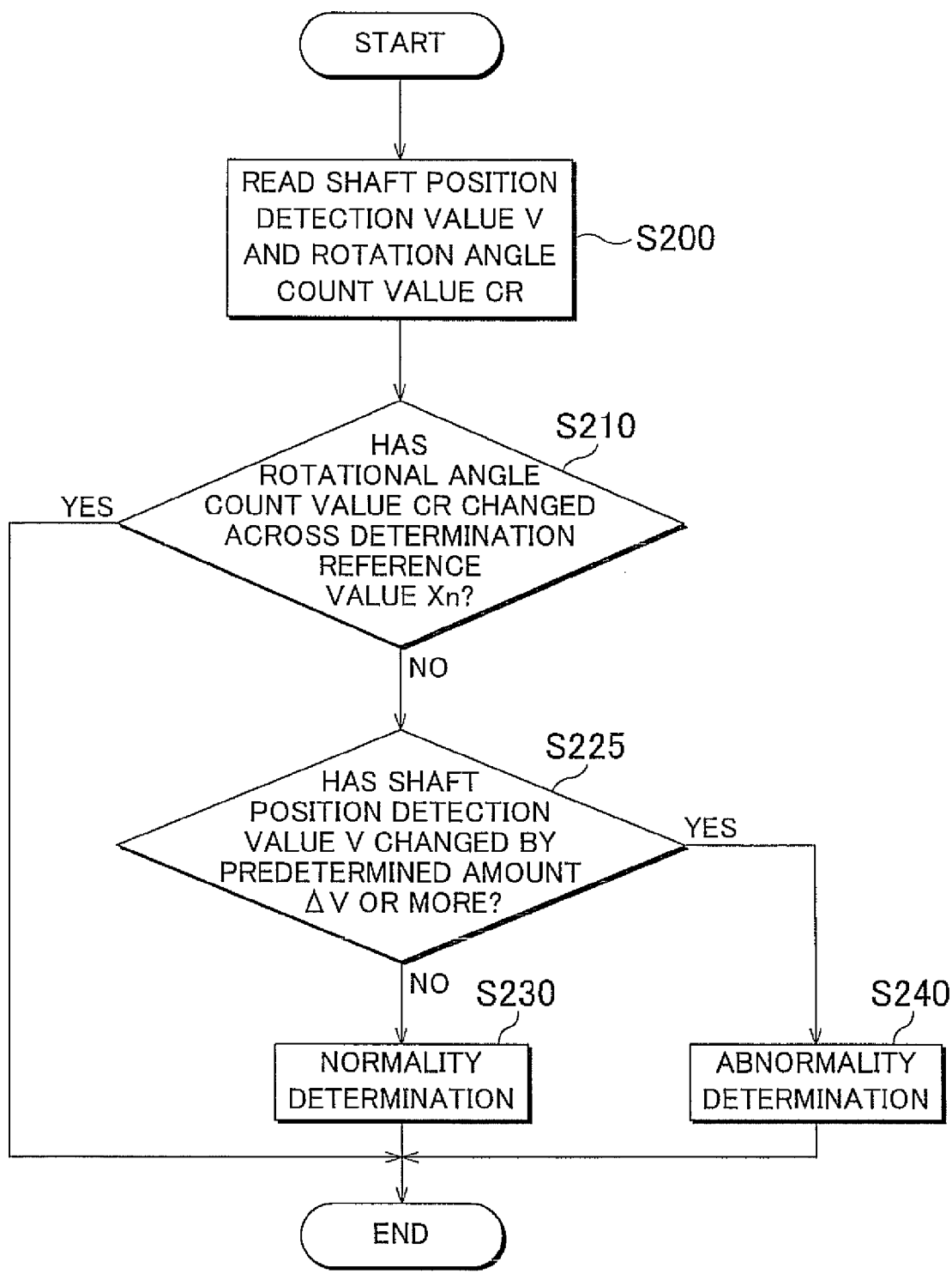
FIG. 10 is a flowchart showing a sequence of processes in an abnormality determination process according to a modified example of the first embodiment.

Specifically, as shown in FIG. 10, step S220 is omitted from the abnormality determination process described with reference to FIG. 9. If it is determined in step S210 that the rotation angle count value CR has changed across the determination reference value Xn (step S210: YES), this process is temporarily terminated.

On the other hand, if it is determined in step S210 that the rotation angle count value CR has not changed across the determination reference value Xn (step S210: NO), the process proceeds to step S225, where it is determined whether or not the shaft position detection value V has changed by $\Delta V$ or more.

Then, if it is determined in step S225 that the shaft position detection value V has not changed by $\Delta V$ or more (step S225: NO), the process proceeds to step S230, where normality determination is performed. On the other hand, if it is determined in step S225 that the shaft position detection value V has changed by $\Delta V$ or more (step S225: YES), that is, if it is determined that the shaft position detection value V has changed even though the rotation angle count value CR has not changed across the determination reference value Xn, the process proceeds to step S240, where abnormality determination is performed.

Also according to this configuration, it is possible to perform abnormality determination for the valve characteristics change mechanism 300 depending on the correlation between changes in shaft position detection value V and changes in rotation angle count value CR. Hereinafter, a description will be made of a second embodiment in which an abnormality determination apparatus for a valve characteristics change mechanism according to the present invention is embodied as an electronic control unit for an internal combustion engine equipped with the valve characteristics change mechanism with reference to FIGS. 11 and 12. The first embodiment and this embodiment are different only in the procedures of the abnormality determination process. Therefore, like components and like processes in the both embodiments are denoted by the same reference numerals to omit their descriptions. The following description focuses on the differences between the first embodiment and the second embodiment.

Figure 11:
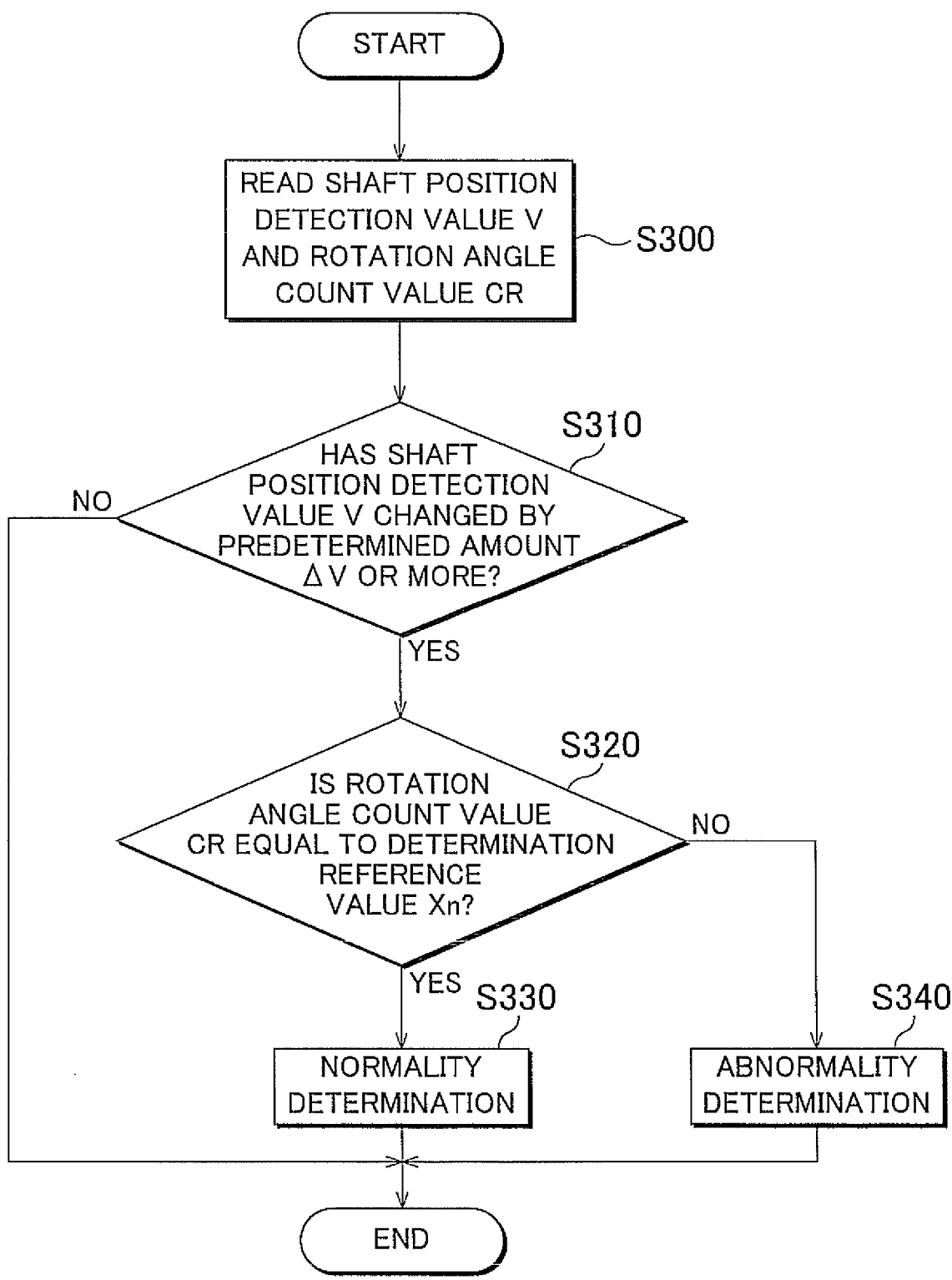
FIG. 11 is a flowchart showing a sequence of processes in an abnormality determination process according to a second embodiment of the present invention.

FIG. 11 is a flowchart showing a sequence of processes in the abnormality determination process according to this embodiment. This process is executed by the electronic control unit 100 repeatedly in a predetermined control cycle while the valve characteristics change mechanism 300 is driven.

When this process is executed, first in step S300, the electronic control unit 100 reads the shaft position detection value V and the rotation angle count value CR. Then, in step S310, it is determined whether or not the shaft position detection value V has changed by the predetermined amount $\Delta V$ or more. That is, a comparison is made between the shaft position detection value V in the preceding control cycle and the shaft position detection value V in the current control cycle to determine whether or not the difference between these values is $\Delta V$ or more.

If it is determined in step S310 that the shaft position detection value V has not changed by $\Delta V$ or more (step S310: NO), the process is temporarily terminated. On the other hand, if it is determined in step S310 that the shaft position detection value V has changed by the predetermined amount ΔV or more (step S310: YES), the process proceeds to step S320, where it is determined whether or not the current rotation angle count value CR is equal to the determination reference value Xn. Specifically, it is determined whether or not the rotation angle count value CR is between Xn−α, which is less than the determination reference value Xn by a predetermined amount α, and Xn+α, which is more than the determination reference value Xn by the predetermined amount α, and it is determined whether or not the rotation angle count value CR is equal to the determination reference value Xn based on the determination results. That is, if the rotation angle count value CR is in the range from Xn−α to Xn+α, it is determined that the rotation angle count value CR at the time when the shaft position detection value V has changed is equal to the determination reference value Xn. On the other hand, if the rotation angle count value CR is not in the range from Xn−α to Xn+α, it is determined that the rotation angle count value CR at the time when the shaft position detection value V has changed is not equal to the determination reference value Xn.

If it is determined in step S320 that the rotation angle count value CR is equal to the determination reference value Xn (step S320: YES), the process proceeds to step S330, where normality determination is performed to indicate that the valve characteristics change mechanism 300 is operating normally along with driving of the actuator 200. After performing normality determination, the electronic control unit 100 temporarily terminates this process.

On the other hand, if it is determined in step S320 that the rotation angle count value CR is not equal to the determination reference value Xn (step S320: NO), the process proceeds to step S340, where abnormality determination is performed to indicate that an abnormality is occurring in the valve characteristics change mechanism 300. In the case where abnormality determination is performed, the electronic control unit 100 executes abnormality control such as turning on a warning lamp to inform the driver of the occurrence of an abnormality and prohibiting driving of the valve characteristics change mechanism 300.

Figure 12:
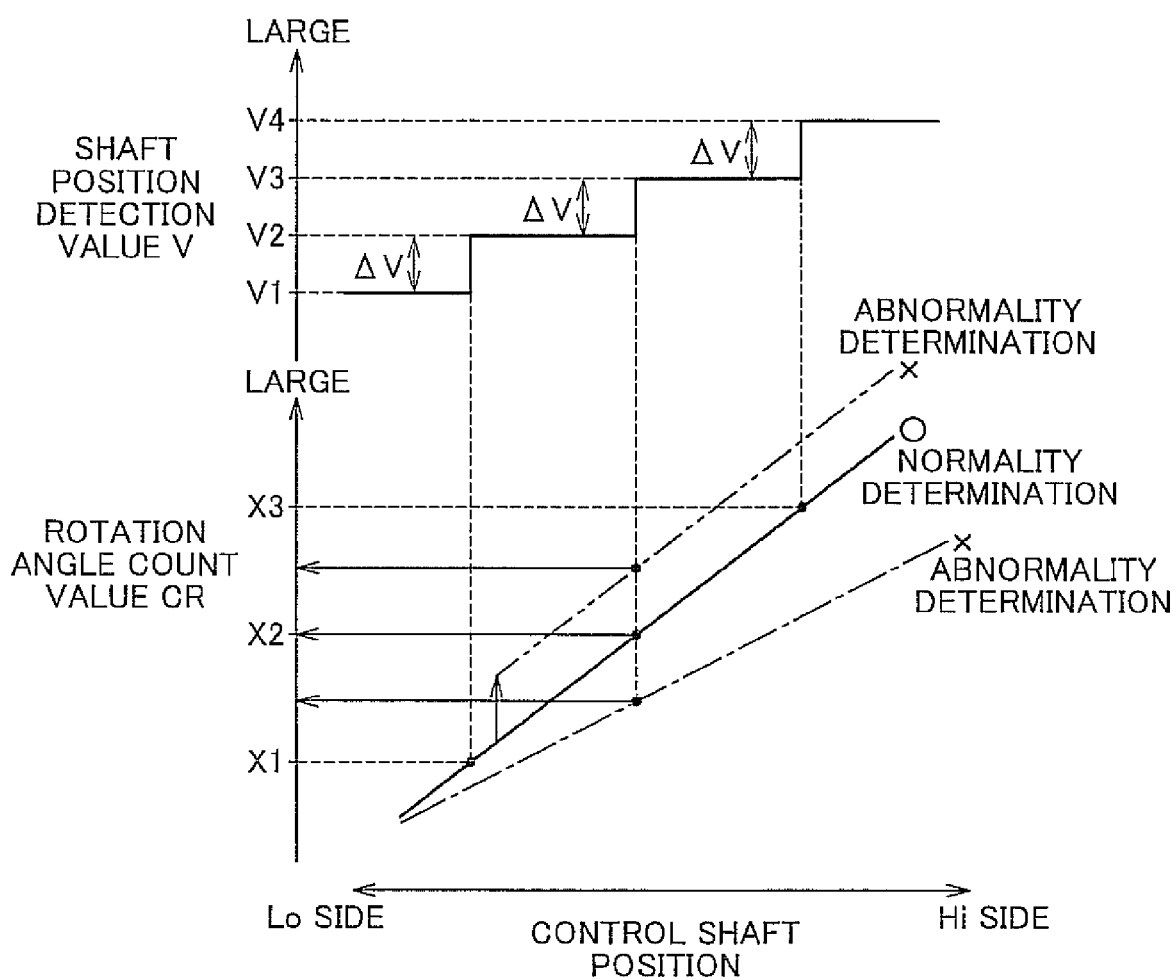
FIG. 12 illustrates the determination mode in the abnormality determination process according to the second embodiment.
Figure 13:
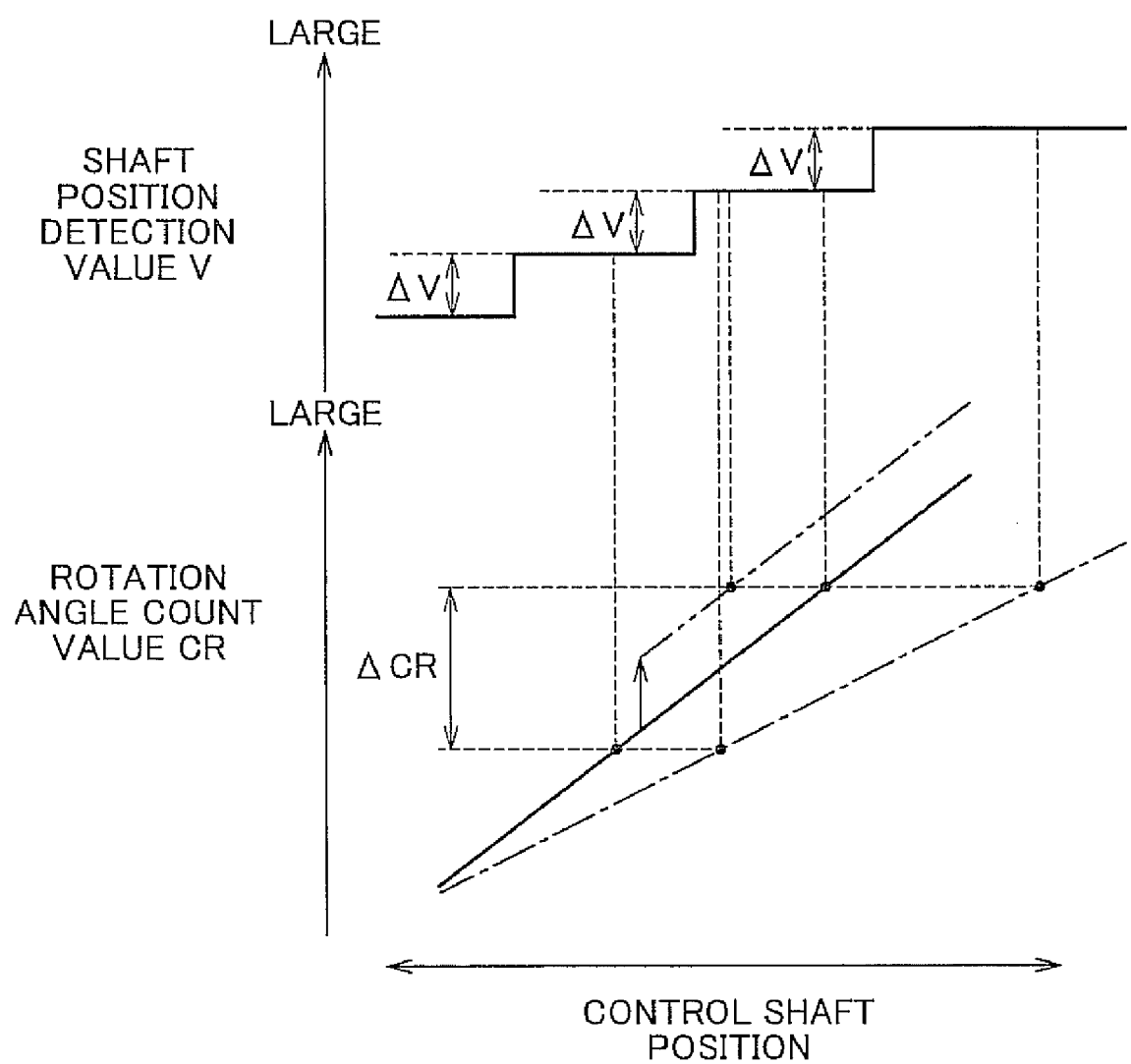
FIG. 13 illustrates the determination mode in a conventional abnormality determination process using a shaft position detection sensor whose output signal changes stepwise.

A description is made of the function of the abnormality determination process according to this embodiment with reference to FIG. 12. In the abnormality determination process according to this embodiment, it is monitored whether or not the rotation angle count value CR detected when the shaft position detection value V has changed by the predetermined amount ΔV or more along with driving of the actuator 200 is equal to the determination reference value Xn.

Therefore, in the case where the valve characteristics change mechanism 300 is operating normally along with driving of the actuator 200 as indicated by the solid line in FIG. 12, the rotation angle count value CR detected when the shaft position detection value V has changed by ΔV, for example from V2 to V3 or from V3 to V2, along with displacement of the control shaft 340 is equal to the determination reference value X2. On the basis of the above, normality determination is performed.

Meanwhile, in the case where the amount of change in rotation angle count value CR is decreased relative to the amount of displacement of the control shaft 340 as indicated by the single-dashed line in FIG. 12 because of wear of gears constituting the motion conversion mechanism 220 of the actuator 200, for example, the rotation angle count value CR detected when the shaft position detection value V has changed by ΔV, for example from V2 to V3 or from V3 to V2, is different from any one of the determination reference values. On the basis of the above, abnormality determination is performed.

Moreover, in the case where the rotation angle count value CR is changed halfway through as indicated by the double-dashed line in FIG. 12 because of erroneous detection by the rotation angle sensors, for example, so that the amount of change in rotation angle count value CR does not correspond to the amount of displacement of the control shaft 340, the rotation angle count value CR detected when the shaft position detection value V has changed by ΔV, for example from V2 to V3 or from V3 to V2, is different from any one of the determination reference values. On the basis of the above, abnormality determination is performed.

According to the second embodiment described above, the following effects are obtained in addition to the effects (1) and (3) to (5) of the above first embodiment. (1) In the case where the rotation angle count value CR at the time when the shaft position detection value V has changed is equal to the determination reference value Xn, the rotation angle count value CR at the time when the shaft position detection value V has changed and the determination reference value Xn correspond to each other. On the basis of the above, normality determination can be performed to indicate that the valve characteristics change mechanism 300 is operating normally. On the other hand, in the case where the rotation angle count value CR at the time when the shaft position detection value V has changed is not equal to the determination reference value Xn, the rotation angle count value CR at the time when the shaft position detection value V has changed and the determination reference value Xn do not correspond to each other. On the basis of the above, abnormality determination can be performed to indicate that an abnormality is occurring in the valve characteristics change mechanism 300. That is, by monitoring whether or not the rotation angle count value CR detected by the rotation angle sensors S1, S2 when the shaft position detection value V has changed is equal to the determination reference value Xn as in the second embodiment, it is possible to determine based on the monitoring results whether or not the valve characteristics change mechanism 300 is operating normally.

The above first and second embodiments may be modified suitably and implemented as follows.

Although one determination reference value Xi is actually detected and other determination reference values Xn are calculated based on the determination reference value Xi in the determination reference value learning process in the above embodiments, all the determination reference values Xn may be set based on actually detected values.

Alternatively, the determination reference value learning process may be omitted and the shaft position detection sensor 120 may be attached such that the shaft position detection value V changes at the prescribed determination reference values Xn. That is, a correlation may be established in advance at least between the rotation angle count value CR at the time when the shaft position detection value V changes and the determination reference value Xn so that abnormality determination can be performed by monitoring whether or not these values change in correspondence with each other.

Although the rotation angle sensors S1, S2 are provided as a drive amount detector to detect the drive amount of the actuator 200 as the rotation angle count value CR in the above embodiments, the rotation angle sensors S1, S2 are merely illustrative of the drive amount detector that detects the drive amount of the actuator 200, and the drive amount detector is not limited thereto. That is, the configuration of the drive amount detector may be modified suitably.

An abnormality determination apparatus for a valve characteristics change mechanism according to the present invention is exemplified as an abnormality determination apparatus for the valve characteristics change mechanism 300 that changes the maximum lift amount and the lift duration of the intake valve 31. In contrast, an abnormality determination apparatus for a valve characteristics change mechanism according to the present invention may be applied to a valve characteristics change mechanism that changes the maximum lift amount and the lift duration of the exhaust valve 41.

Although the control shaft 340 is driven to move axially in the above first and second embodiments, the control shaft 340 may be movable in other directions. For example, the control shaft 340 may be driven to move circumferentially (rotate).

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations other combinations and configurations, including more, less or only a single element, are also within the scope of the invention.

What is claimed is:

1. An abnormality determination apparatus that determines whether or not a valve characteristics change mechanism is operating normally, in an internal combustion engine that includes the valve characteristics change mechanism that changes a maximum lift amount and a lift duration of an engine valve continuously in correspondence with a position of a control shaft, an actuator that drives the control shaft in an axial direction, and a drive amount detector that detects a drive amount of the actuator, wherein the maximum lift amount and the lift duration of the engine valve are changed by controlling the actuator such that the drive amount approaches a target drive amount, the abnormality determination apparatus comprising:
    a shaft position detection sensor that outputs, as a shaft position detection value, a signal whose magnitude changes stepwise by a predetermined amount in correspondence with the position of the control shaft in the axial direction, wherein
    the abnormality determination apparatus stores in advance, as a determination reference value, the drive amount at the time when the shaft position detection value, which changes stepwise, changes by one step, and
    the abnormality determination apparatus performs normality determination to indicate that the valve characteristics change mechanism is operating normally if the shaft position detection value changes when the drive amount changes across the determination reference value along with driving of the actuator, and performs abnormality determination to indicate that an abnormality is occurring in the valve characteristics change mechanism if the shaft position detection value does not change when the drive amount changes across the determination reference value.

2. The abnormality determination apparatus according to claim 1, wherein
    the abnormality determination apparatus drives the control shaft in one direction to actually detect the drive amount at the time when the shaft position detection value changes, and stores the detected drive amount as the determination reference value.

3. The abnormality determination apparatus according to claim 2, wherein
    the abnormality determination apparatus displaces the control shaft in one direction to actually detect at least one said drive amount at the time when the shaft position detection value changes, stores the detected drive amount as the determination reference value, and calculates other determination reference values based on the determination reference value obtained from the actually detected drive amount.

4. The abnormality determination apparatus according to claim 3, wherein
    after displacing the control shaft in one direction to store the determination reference value, the abnormality determination apparatus performs a reference position learning process to correct the drive amount based on a drive amount detected when the control shaft is driven to and stopped at a mechanical limit movable position, and corrects the determination reference value based on a correction amount used in the reference position learning process.

5. The abnormality determination apparatus according to claim 2, wherein
    after displacing the control shaft in one direction to store the determination reference value, the abnormality determination apparatus performs a reference position learning process to correct the drive amount based on a drive amount detected when the control shaft is driven to and stopped at a mechanical limit movable position, and corrects the determination reference value based on a correction amount used in the reference position learning process.

6. An abnormality determination apparatus that determines whether or not a valve characteristics change mechanism is operating normally, in an internal combustion engine that includes the valve characteristics change mechanism that changes a maximum lift amount and a lift duration of an engine valve continuously in correspondence with a position of a control shaft, an actuator that drives the control shaft in an axial direction, and a drive amount detector that detects a drive amount of the actuator, wherein the maximum lift amount and the lift duration of the engine valve are changed by controlling the actuator such that the drive amount approaches a target drive amount, the abnormality determination apparatus comprising:
    a shaft position detection sensor that outputs, as a shaft position detection value, a signal whose magnitude changes stepwise by a predetermined amount in correspondence with the position of the control shaft in the axial direction, wherein
    the abnormality determination apparatus stores in advance, as a determination reference value, the drive amount at the time when the shaft position detection value, which changes stepwise, changes by one step, and
    the abnormality determination apparatus performs normality determination to indicate that the valve characteristics change mechanism is operating normally if the drive amount at the time when the shaft position detection value changes along with driving of the actuator is equal to the determination reference value, and performs abnormality determination to indicate that an abnormality is occurring in the valve characteristics change mechanism if the drive amount at the time when the shaft position detection value changes is not equal to the determination reference value.

7. The abnormality determination apparatus according to claim 6, wherein
    the abnormality determination apparatus drives the control shaft in one direction to actually detect the drive amount at the time when the shaft position detection value changes, and stores the detected drive amount as the determination reference value.

8. The abnormality determination apparatus according to claim 7, wherein
the abnormality determination apparatus displaces the control shaft in one direction to actually detect at least one said drive amount at the time when the shaft position detection value changes, stores the detected drive amount as the determination reference value, and calculates other determination reference values based on the determination reference value obtained from the actually detected drive amount.

9. The abnormality determination apparatus according to claim 8, wherein
after displacing the control shaft in one direction to store the determination reference value, the abnormality determination apparatus performs a reference position learning process to correct the drive amount based on a drive amount detected when the control shaft is driven to and stopped at a mechanical limit movable position, and corrects the determination reference value based on a correction amount used in the reference position learning process.

10. The abnormality determination apparatus according to claim 7, wherein
after displacing the control shaft in one direction to store the determination reference value, the abnormality determination apparatus performs a reference position learning process to correct the drive amount based on a drive amount detected when the control shaft is driven to and stopped at a mechanical limit movable position, and corrects the determination reference value based on a correction amount used in the reference position learning process.

* * * * *